United States Patent [19]
Brown

[11] Patent Number: 5,814,737
[45] Date of Patent: Sep. 29, 1998

[54] APPARATUS AND METHOD OF DETECTING AN ULTRASONIC SIGNAL

[75] Inventor: Alvin E. Brown, Santa Cruz, Calif.

[73] Assignee: Dieterich Technology Holding Corp., Boulder, Colo.

[21] Appl. No.: 790,657

[22] Filed: Jan. 29, 1997

Related U.S. Application Data

[63] Continuation-in-part of Ser. No. 720,863, Oct. 4, 1996, Pat. No. 5,639,971.

[51] Int. Cl.⁶ ...................................................... G01F 1/66
[52] U.S. Cl. ..................................... 73/861.28; 73/861.27
[58] Field of Search ........................... 73/861.27, 861.28, 73/861.29, 861.31

[56] References Cited

U.S. PATENT DOCUMENTS

| | | | |
|---|---|---|---|
| 3,693,433 | 9/1972 | Kobori et al. | 73/861.31 X |
| 3,916,676 | 11/1975 | Boggs et al. | 73/609 |
| 4,183,244 | 1/1980 | Kohno et al. | 73/861.28 |
| 4,630,482 | 12/1986 | Traina | 73/861.28 X |
| 4,748,857 | 6/1988 | Nakagawa | 73/861.28 |
| 4,882,931 | 11/1989 | Breeuwer | 73/861.27 X |
| 5,035,147 | 7/1991 | Woodward | 73/861.29 X |
| 5,123,286 | 6/1992 | Baumgartner | 73/861.27 |
| 5,178,018 | 1/1993 | Gill | 73/861.28 |

Primary Examiner—Elizabeth L. Dougherty
Attorney, Agent, or Firm—Richard W. Hanes

[57] ABSTRACT

An apparatus (300) for detecting an ultrasonic signal (304) has a transducer (302) that produces an electrical signal (306) in response to the ultrasonic signal (304). A threshold comparator (308) receives the electrical signal (306) and produces a phase one signal (310) and a phase two signal (312). An arming circuit (314) receives the phase one signal (310) and the phase two signal (312) and producing an arming signal. A triggering circuit (316) receives the arming signal and the electrical signal (306) and produces a signal detected signal (318).

16 Claims, 12 Drawing Sheets

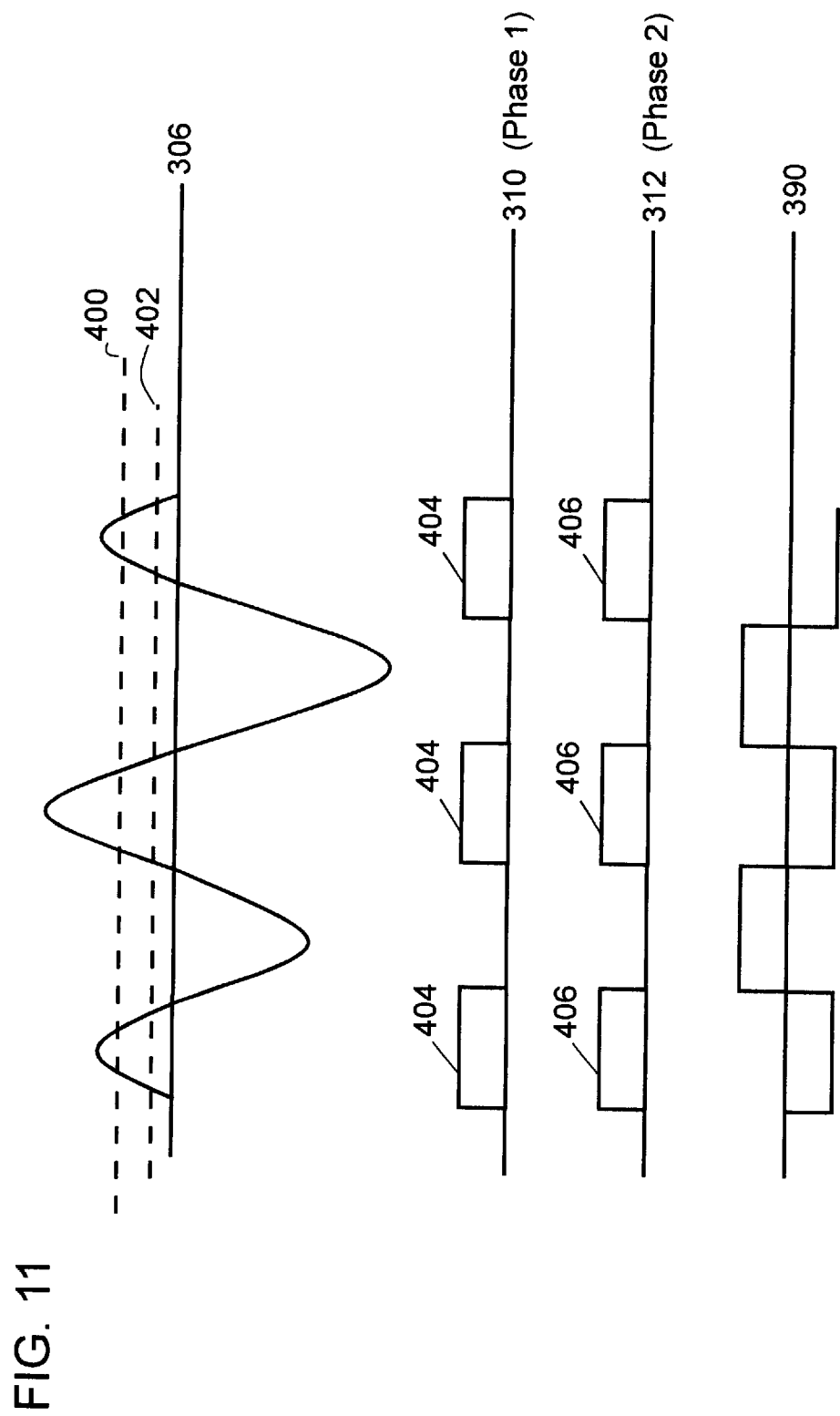

APPARATUS AND METHOD OF DETECTING AN ULTRASONIC SIGNAL

RELATED APPLICATIONS

This application is a continuation in part of patent application (Ser. No. 08/720,863), filed Oct. 4, 1996, U.S. Pat. No. 5,639,971 entitled "Method and Apparatus for Detecting a Signal", assigned to the same assignee as the present application.

FIELD OF THE INVENTION

The present invention relates generally to the field of ultrasonic flow meters and more particularly to an apparatus and method of detecting an ultrasonic signal.

BACKGROUND OF THE INVENTION

Ultrasonic flow meters have many advantages over other methods of determining flow rates. Ultrasonic flow meters can continuously measure the flow rate, while other methods generally measure average flow rates. In addition, ultrasonic flow meters are obstruction less and work with non-conductive fluids.

Ultrasonic flow meters have a pair of transducers that are placed on either side of the flow path of a fluid flowing through a pipe. The transducers are pointed at each other and placed on either side of the flow path of a fluid flowing through a pipe. The line between the transducers has a component in the direction of the fluid flow. The principle used to detect flow rates is that the transit time of an ultrasonic packet will increase in the upstream and decrease in the downstream path. The amount by which the transit time changes is directly proportional to the flow rate. Generally, the signal is detected by setting threshold and determining when the signal exceeds the threshold. Once the threshold is exceeded the signal is detected at the next positive going, zero threshold. Unfortunately, noise can cause the signal to exceed the threshold and result in false detections. As a result the ultrasonic flow meter gives erroneous results. This result is inconsistent and erroneous transit time information. Automatic gain control circuits are used to overcome this problem. An automatic gain control circuit adjusts the overall signal so that it has a constant amplitude. However, the automatic gain control circuit only adjusts the overall signal level and noise can still cause the false detections.

Thus there exists a need for a method an apparatus that can detect the signal without false detections.

SUMMARY OF THE INVENTION

A method of detecting an ultrasonic signal in an ultrasonic flow meter that overcomes these and other problems, requires selecting a threshold control level. Next it is determined if the ultrasonic signal exceeds a first level and a second level. When the ultrasonic signal exceeds the first level and the second level, a trigger is armed and a detected signal is formed by triggering on an edge of the ultrasonic signal.

BRIEF DESCRIPTION OF THE DRAWINGS

FIG. 11 is a signal diagram of the signals in FIG. 10; and

DETAILED DESCRIPTION OF THE DRAWINGS

Figure 1:
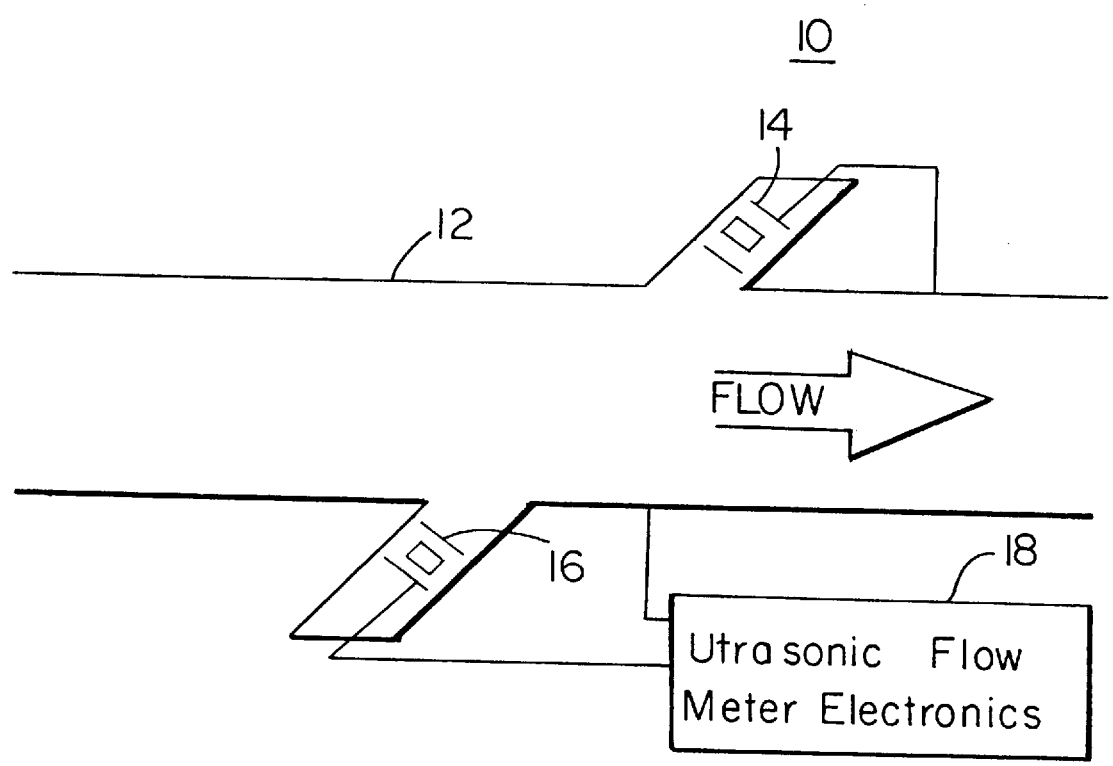
FIG. 1 is a schematic diagram of an ultrasonic flow meter attached to a conduit.

An ultrasonic flow meter 10 attached to a pipe 12 having a fluid flowing through it is shown in FIG. 1. The ultrasonic flow meter has a pair of transducers 14, 16. The pair of transducers 14, 16 are coupled to the ultrasonic flow meter electronics 18, that generates, detects and aligns an ultrasonic pulse.

Figure 2:
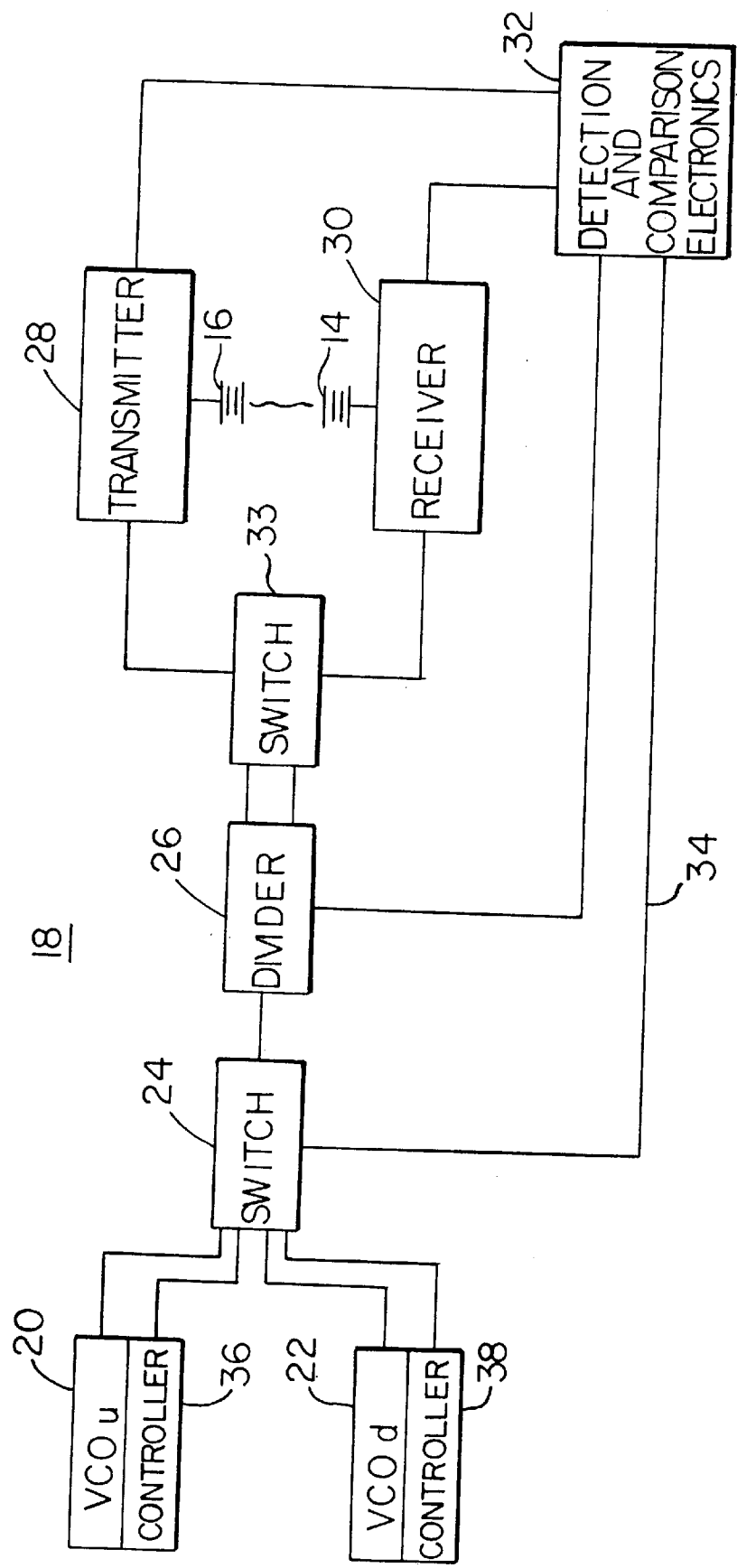
FIG. 2 is a block diagram of the ultrasonic flow meter.

FIG. 2 is a block diagram of the ultrasonic flow meter electronics 18 connected to the pair of transducers 14, 16. An upstream voltage controlled oscillator 20 and a downstream voltage controlled oscillator 22 are alternatively used to drive a transmit transducer 14, 16. The voltage controlled oscillators (oscillator signal, oscillator) 20, 22 are connected to a switch 24 that couples the oscillator signal to a divider 26. The divider 26 divides the oscillator signal down that is then coupled to a transmitter 28, a receiver (receiver electronics) 30 and a detection and comparison electronics 32 by a switch 33. The receiver 30 is coupled to a receive transducer 14, 16. The detection and comparison electronics 32 generates an early-late control signal 34 that is used to drive a controller 36, 38 that controls the voltage controlled oscillator 20, 22.

Figure 3:
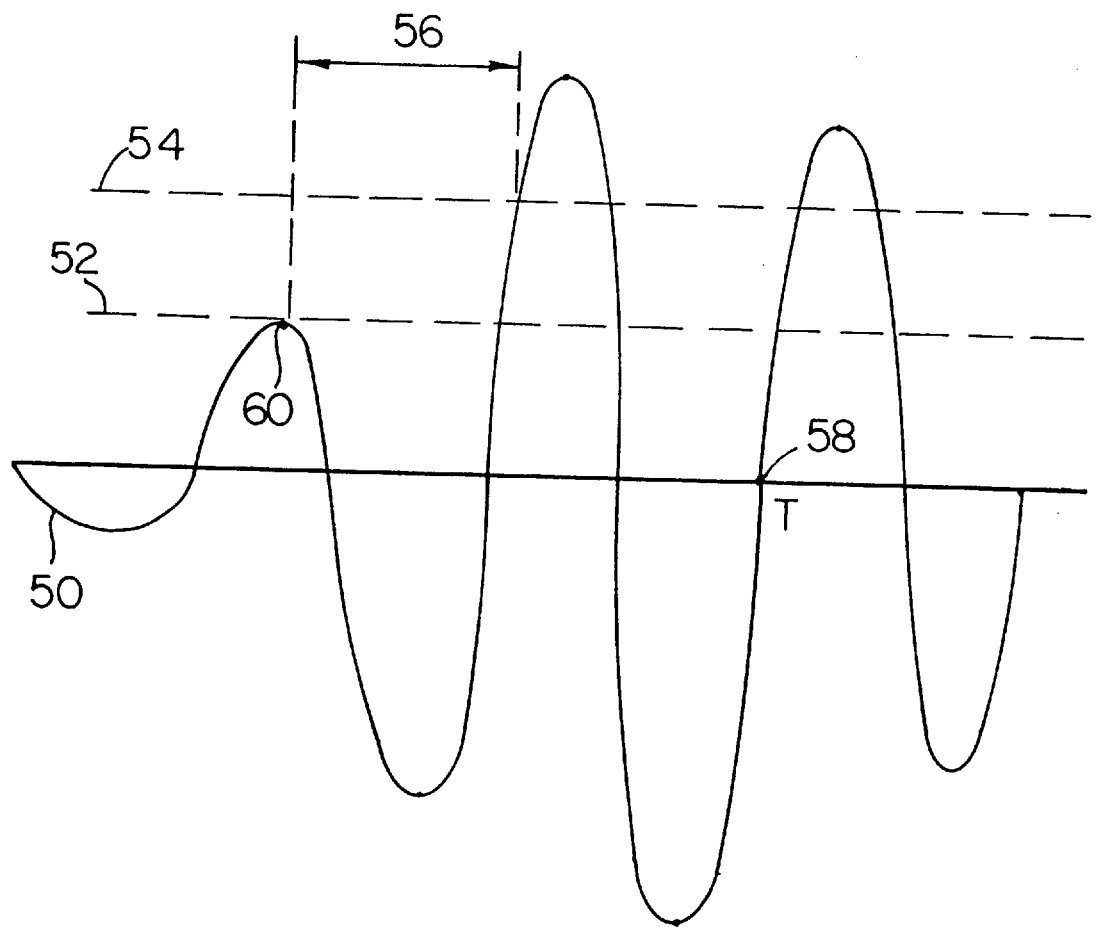
FIG. 3 is a signal diagram of a received signal.

FIG. 3 is a signal diagram of the received signal 50. The received signal 50 generally increases in amplitude for a couple of cycles and then decreases in amplitude for the last couple of cycles. The detection circuit first determines when the signal 50 crosses a first threshold (first level) 52. The detection circuit then determines when the signal crosses the second threshold (second level) 54. A time difference 56 between the crossing of the first threshold and the crossing of the second threshold is determined. When this time difference 56 is substantially less than one cycle (delta time), the detection circuit decreases the first threshold 52 by a delta level. The second threshold 54 is a fixed voltage (predetermined level, predetermined voltage) above the first threshold level 52. The period of the received signal 50 is known and is determined by the drive signal (transmit sequence) applied to the transmit transducer. In one embodiment, the drive signal has a period equal to the natural frequency of the transducer (i.e., 1.1 MHz). When the time difference 56 is greater than one half a period of the received signal 50 and less than one and one half periods, then the first threshold level 52 is increased. When the time period 56 is greater than one and one half the period of the received signal 50, it is assumed that noise has corrupted the detection process and the signal is not detected. When the time period 56 is less than one and one half the period, the signal is detected. The signal is detected at the next positive going, zero crossing 58 after the second threshold 54 is detected. In another embodiment the signal is detected at any subsequent zero crossing. This process insures that the signal 50 is always detected at the same point along the signal (i.e., at 2½ cycles from the start of the signal 50). Ideally, the first threshold will toggle between intersecting the first positive peak 60 and being just above the first positive peak 60. Thus the first threshold will alternately shift up and down the delta level.

Figure 4:
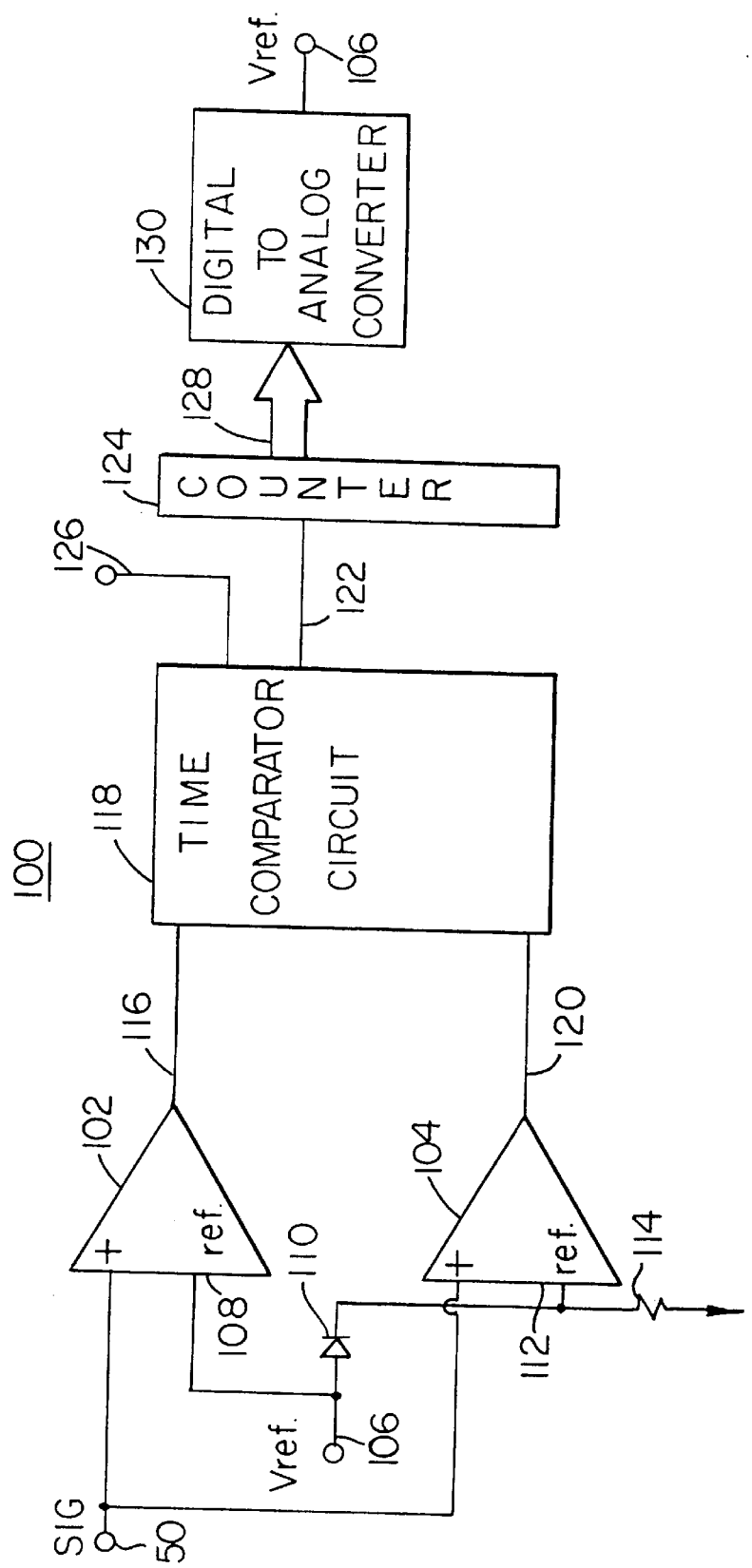
FIG. 4 is a block diagram of a detection circuit.

FIG. 4 is a block diagram of a detection circuit 100. The received signal 50 is applied to a pair of comparators 102, 104 that compare the signal against the first threshold 52 and the second threshold 54. A reference voltage 106 is applied to the reference input 108 of the comparator 102. The reference voltage 106 is equal to the second threshold 54. The reference voltage 106 is also applied across a diode 110 to a reference input 112 of the comparator (first threshold comparator) 104. The voltage at the reference input 112 is equal to the first threshold 52. A resistor 114 connects the reference input 112 to ground.

The output of comparator (second threshold comparator) 102 is a second threshold signal 116 that is coupled to the time comparator circuit 118. The output of comparator 104 is a first threshold signal 120 that is coupled to the time comparator circuit 118. The time comparator circuit 118 generates an up-down signal 122 that is used to drive a counter 124. The time comparator circuit 118 also generates a detection signal 126. The detection signal 126 is coupled to the comparison electronics 32 (see FIG. 2) to determine if the VCO's frequency needs to be increased or decreased. The output of the counter 124 is a count 128 that is coupled to a digital to analog converter 130. The digital to analog converter 130 converts the count 128 to a control voltage (reference voltage) 106. The reference voltage 106 includes and offset voltage and controls the threshold levels. In one embodiment the counter 124 includes decoding circuitry that prevents the counter from counting below zero. This insures that the first threshold level 52 does not suddenly jump to the high end of its range from the low end its range.

Figure 5:
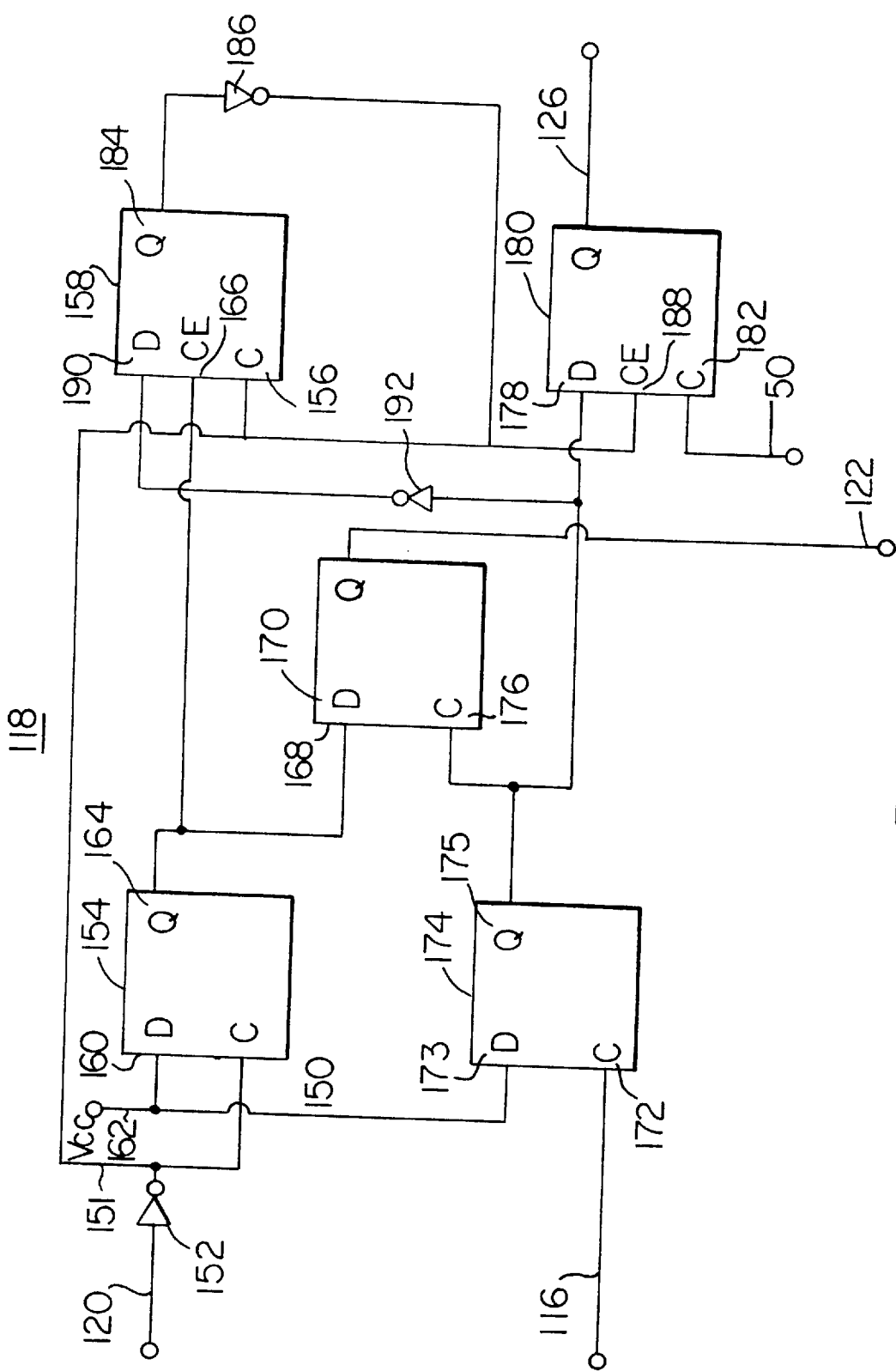
FIG. 5 is a block diagram of an embodiment of a time comparator circuit.

FIG. 5 is a block diagram of an embodiment of the time comparison circuit 118. The first threshold signal 120 is applied to an inverter 152 to form an inverted first threshold signal 151 and then to a clock input 150 of a D flip flop 154. The inverted first threshold signal 151 is also coupled to a clock input 156 of a D flip flop 158. A D-input 160 is connect to a supply voltage 162. A Q-output 164 of the flip flop 154 is coupled to an enable input 166 of the flip flop 158 and to a D-input 168 of a D flip flop 170. The second threshold signal 116 is coupled to a clock input 172 of a D flip flop 174. A D-input 173 of the flip flop 174 is tied to the supply voltage 162. A Q-output 175 of the flip flop 174 is coupled to a clock input 176 of a flip flop 170 and to a D-input 178 if a D flip flop 180. A Q-output of the flip flop 170 is the up-down signal 122. A clock input 182 is coupled to a buffered version of the received signal 50. A Q-output 184 of the flip flop 158 is coupled to an inverter and then to an enable input 188 of the flip flop 180. A Q-output of the flip flop 180 is the detection signal 126. A D-input 190 of the flip flop 158 is coupled to an inverter 192 that is coupled to the Q-output 175 of the flip flop 174.

Figure 6A:
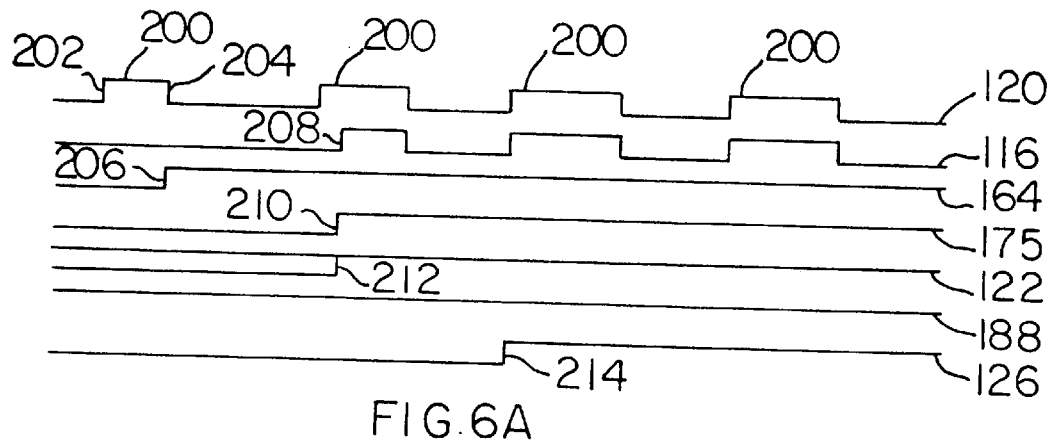
FIGS. 6a–c are signal diagrams of the signals used in the time comparator circuit of FIG. 5.

The operation of the time comparator circuit 118 will be explained with reference to the signal diagrams of FIGS. 6a–c. FIG. 6a shows the signals that occur when the first threshold 52 is increased. The first threshold signal 120 is shown as a square wave of with an increasing positive portion 200. The first threshold signal 120 is positive when the received signal 50 is above the first threshold 52. A first positive going edge (first positive edge, first edge) 202 is inverted by inverter 152 (see FIG. 5) and clocks the flip flop 154 on a trailing edge 204. This results in the Q-output 164 going high 206. The second threshold signal (second signal) 116 has a first positive going edge (first rising edge) 208 that clocks the flip flop 174 causing the Q-output 175 to go high 210. The flip flop 170 is then clocked by the Q-output going high 210, causing the Q output 122 to assume the input value 164 which is high. As a result the up-down signal 122 either goes high or remains high at point 212. The Q-output 175 also serves as the D-input 178 for the flip flop 180. The clock input 182 of the flip flop 180 is clocked by the received signal 50 and the Q-output (detection signal) 126 goes high (detection transition) 214 on the next positive going edge of the received signal after the D-input goes high 210 (i.e., the received signal trips the second threshold). The flip flops 154, 174, 158, 180 are cleared before the next ultrasonic signal is transmitted through the fluid.

Figure 6B:
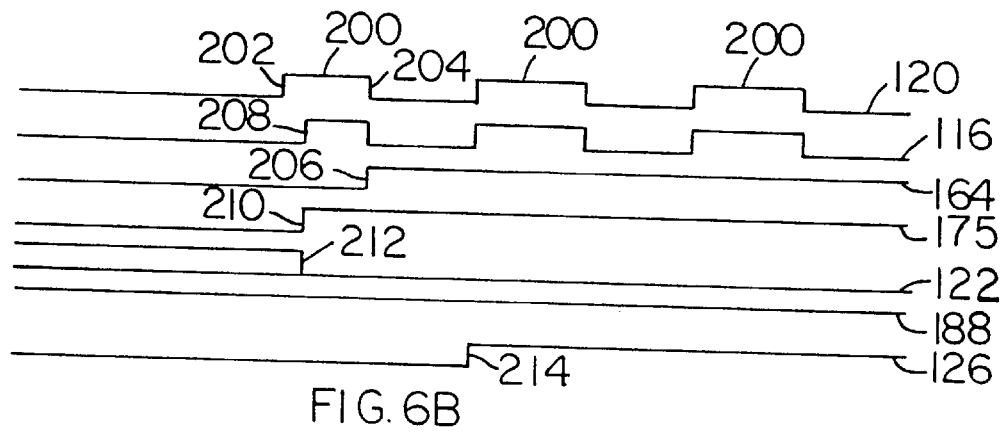

FIG. 6b shows the situation where the first threshold is decreased. In this case the Q-output 164 does not go high 206 before the clock 176 edge 210 of flip flop 170. As a result the Q-output 122 transitions low 212 or stays low.

Figure 6C:
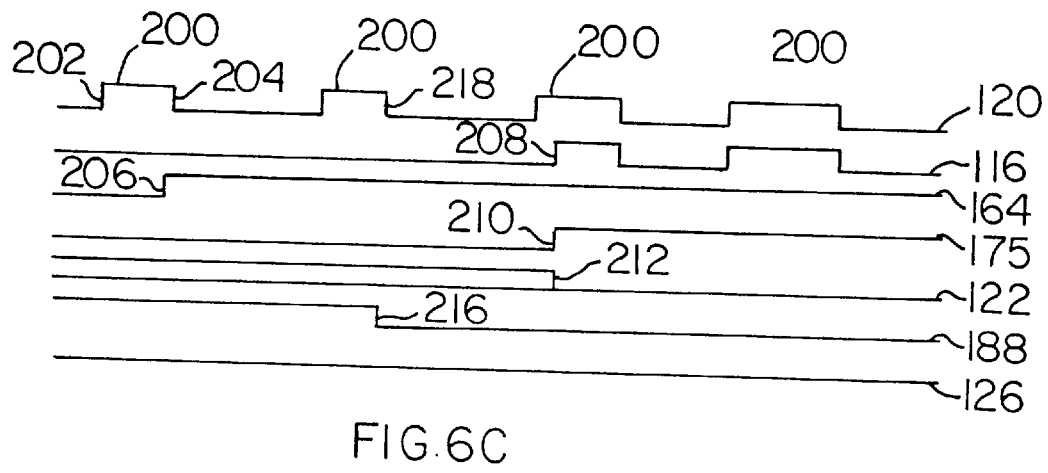

FIG. 6c shows the situation where the time difference is more than a reset time (control time). This occurs when the first threshold 52 trips on more than one cycle of the received signal 50 before the second threshold 54 trips. No signal is detected 214 in this situation. This is accomplished by having the enable input 188 go low 216 before a positive D-input 178 can be clocked by the received signal 182. The enable line 188 is normally high. This means the Q-output 184 is normally low. The D-input 190 goes low 210 when the Q-output 175 goes high 210. The flip flop 158 is clocked by the inverted first threshold signal 151. The flip flop 158 is not enabled until the Q-output 164 goes high 206. As a result the flip flop 158 is not enabled until the falling edge 204 of first threshold signal 120. The flip flop 158 is then clocked on a second falling edge 218 of the first threshold signal (first signal) 120. This clocks the inverse of signal 175 onto the Q-output 184, causing the Q-output to go high and the enable input 188 to go low 216. Disabling the flip flop 180 the next positive going, zero crossing after the second threshold 54 has been tripped 210.

Figure 7:
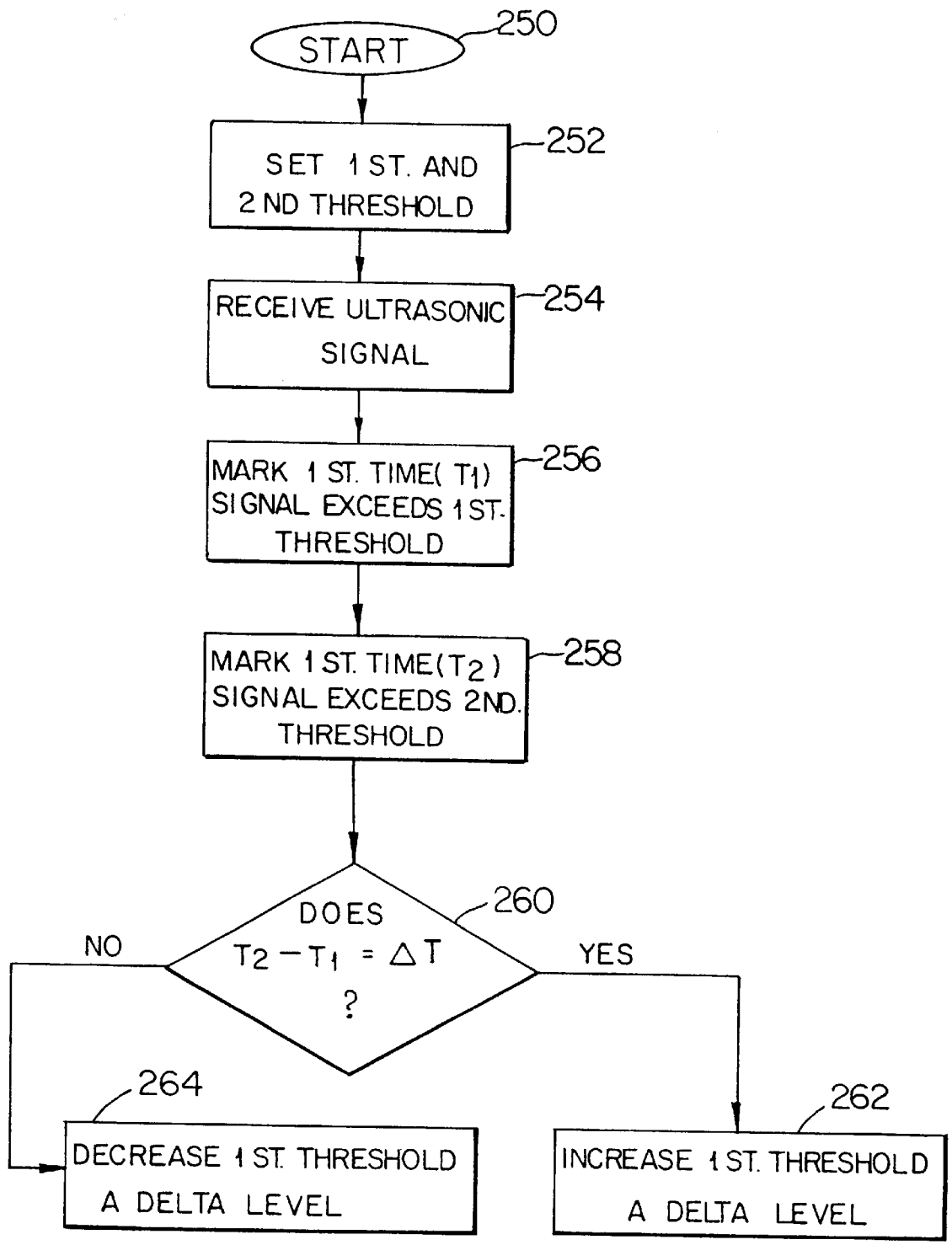
FIG. 7 is a flow chart of an embodiment of the steps used to detect an ultrasonic signal.

FIG. 7 is a flow chart of the process used to adjust the thresholds in the detection scheme. The process starts, step 250, by setting the first and the second threshold at step 252. The second threshold is set at a predetermined level above the first threshold. The ultrasonic signal having a plurality of cycles is received at step 254. The first time the signal exceeds the first threshold is marked as a first threshold time ($T_1$), at step 256. The first time the signal exceeds the second threshold is marked as a second threshold time ($T_2$), at step 258. At step 260, it is determined if the time difference between the first and second threshold time ($T_1-T_2$) is greater than a delta time. When the time difference is greater than a delta time, increasing the first threshold a delta level at step 262. When the time difference is not greater than the delta time, decreasing the first threshold level at step 264.

Figure 8:
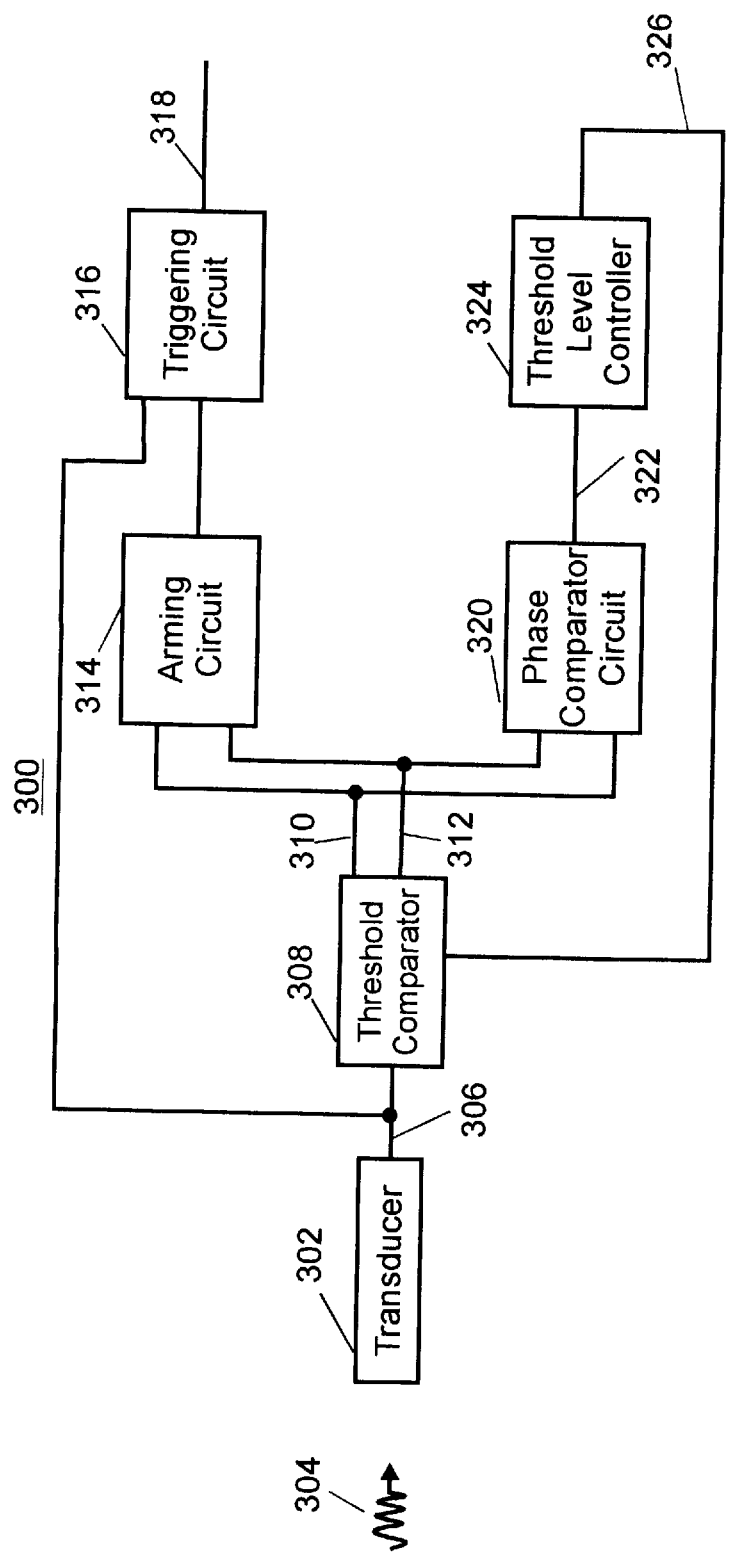
FIG. 8 is a block diagram of another embodiment of an apparatus for detecting an ultrasonic signal.

FIG. 8 is a block diagram another embodiment of an apparatus 300 for detecting an ultrasonic signal in an ultrasonic flow meter. A transducer 302 converts an ultrasonic signal 304 to an electrical signal 306. The electrical signal 306 is coupled to a threshold comparator 308 that compares the electrical signal to a first level and a second level. The result of these comparisons is a phase one signal 310 and a phase two signal 312 that are true when the electrical signal exceeds the first or second level respectively. The arming circuit 314 arms a trigger circuit 316 on a next rising edge of the phase two signal 312 after the first falling edge of the phase one signal 310. The trigger circuit 316 triggers on a falling edge of the electrical signal 306 after being armed, to form a received signal (signal detected signal) 318.

The phase comparator circuit 320 determines if the first rising edge of the phase two signal 312 occurs before the first falling edge of the phase one signal 310. When the first rising edge of the phase two signal 312 occurs before the first falling edge of the phase one signal 310, the signals are in-phase and a phase signal 322 is false. When the phase signal 322 is false, the threshold level controller 324 does not change the threshold signal 326 to the threshold comparator 308.

When the phase signal 322 is true, the threshold level comparator 324 changes the threshold level signal 326. The threshold comparator 308 then adjusts the first level to a third level and the second level to a fourth level.

Figure 9:
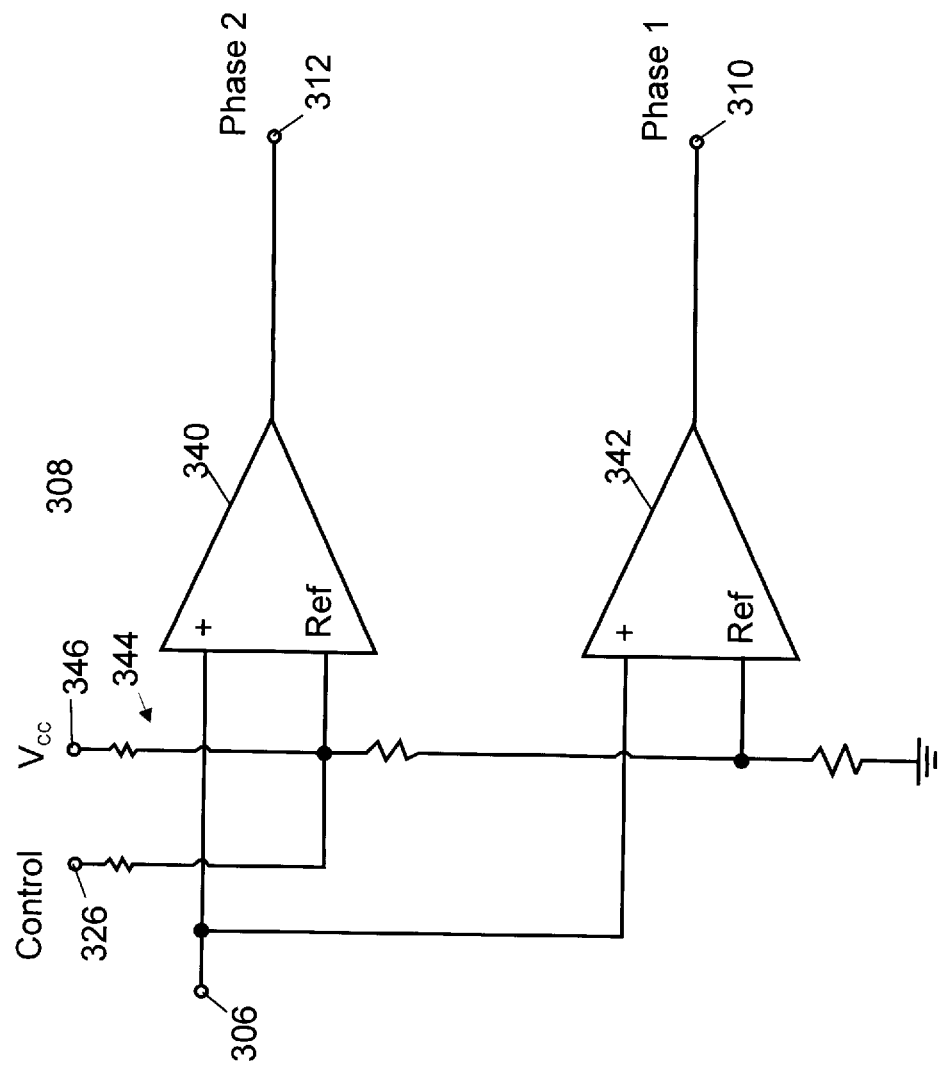
FIG. 9 is a schematic diagram of a threshold comparator.

FIG. 9 is a schematic diagram of the threshold comparator 308. The electrical signal 306 is coupled to a positive input (second input) of a pair of comparators 340, 342. A resistive network (resistive circuit) 344 couples the reference inputs of the pair of comparators 340, 342 to a pair of voltage sources. A first voltage source 346 is always at $V_{cc}$ (5.0 volts). The second voltage source 326 is coupled to the output of the threshold level comparator 324. The second voltage source 326 shifts between zero volts and $V_{cc}$ (5.0 volts) when the phase signal 322 is true. This changes the references inputs from the first level and the second level to the third and fourth level. The output of the pair of comparators 340, 342 are the phase one signal 310 and the phase two signal 312.

Figure 10:
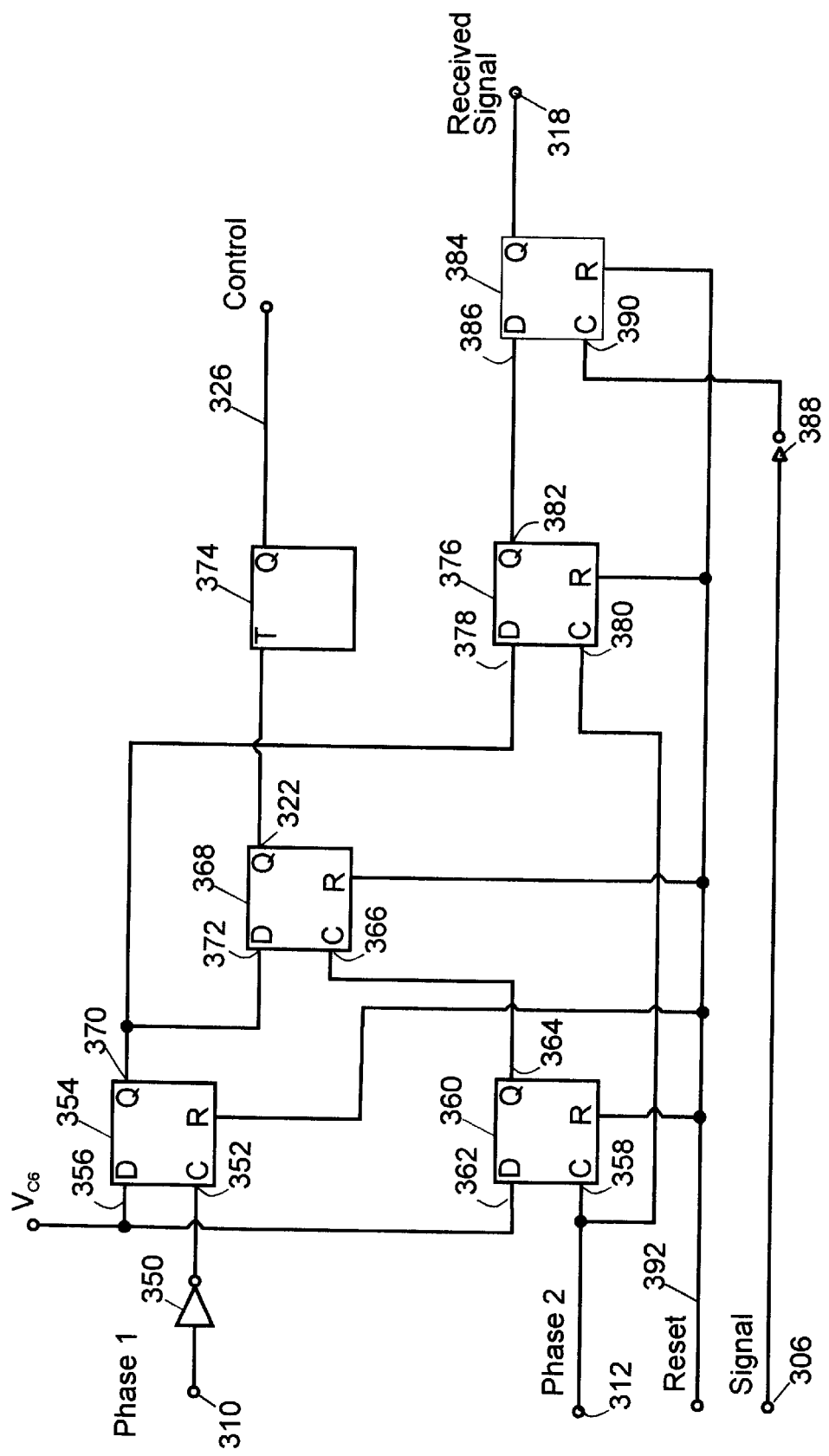
FIG. 10 is a schematic diagram of a portion of the apparatus for detecting an ultrasonic signal.

FIG. 10 is a schematic diagram of the arming circuit 314, phase comparator circuit 320, the trigger circuit 316 and the threshold level controller 324. The phase one signal 310 is coupled to an inverter 350 and then to a clock input 352 of a D flip flop 354. The D input 356 of the first D flip flop 354 is coupled to $V_{cc}$ (5.0 volts). The phase two signal 312 is coupled to a clock input (second clock input) 358 of a second D flip flop 360. The second D flip flop 360 has its D input 362 coupled to $V_{cc}$ (5.0 volts). The output 364 of the second D flip flop 360 is coupled to a clock input (third clock input) 366 of a third D flip flop 368. The output 370 of the first D flip flop 354 is coupled to the D input 372 of the third D flip flop 368. The three D flip flops 354, 360, 368 form the phase comparator circuit 320 and output 322 of the third D flip flop 368 is the phase signal 322. The phase signal 322 is coupled to a toggle flip flop 374 that performs the function of the threshold level controller 324. The output of the toggle flip flop 374 is the threshold signal 326.

Another D flip flop 376 has its D input 378 coupled to the output 370 of the D flip flop 354 and its clock input 380 coupled to the phase two signal 312. The D flip flop 376 performs the function of the arming circuit 314. The output (arming signal) 382 of the D flip flop 376 arms the D flip flop 384 and is coupled to the D input 386. The electrical signal 306 is coupled through an inverter 388 to a clock input 390 of the D flip flop 384. The D flip flop 384 performs the functions of the trigger circuit 316. As a result the output (received signal) 318 of the D flip flop 384 goes high on a falling edge of the electrical signal after the D flip flop 384 is armed. After the received signal is triggered a reset signal 392 resets all the D flip flops 354, 360, 368, 376, 384. The operation of the circuit will be explained in more detail with respect to the signal diagrams of FIGS. 11 & 12. While the embodiment shown is implemented using D flip flops other types of flip flops could be used or the functions of the circuit could be performed in the firmware of microprocessor. These and other embodiments will be obvious to those skilled in the art and are considered part of the invention as defined by the appended claims.

FIG. 11 is a signal diagram of the signals in FIG. 10. The top signal diagram is the electrical signal 306. The two dashed lines 400, 402 represent the first level 402 and the second level 400. When the electrical signal 306 is greater than the first threshold level 402 the phase one signal 310 transitions to a high level 404. When the electrical signal 306 is greater than the second threshold level 400, the phase two signal 312 transitions to a high level 406. In one embodiment, the inverter 388 overdrives the electrical signal 306 to form the square wave 390. These signals are used by the circuit to perform all the operations of the apparatus 300 of FIG. 8.

Figure 12A:
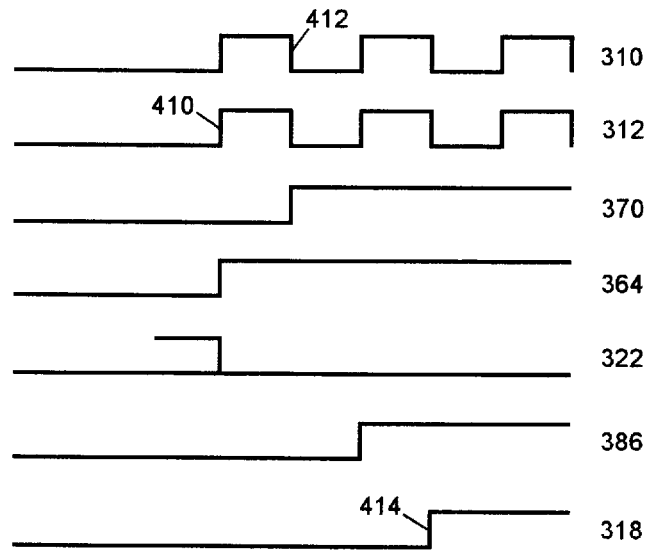
FIG. 12a & b are signal diagrams of the signals in FIG. 10.
Figure 12B:
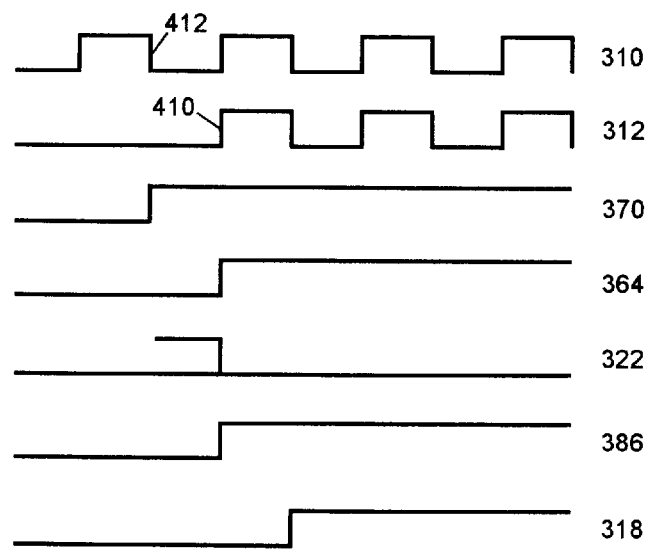

FIG. 12a illustrates an in-phase state where the electrical signal 306 crosses both the first level 402 and the second level 400 in the same cycle, as shown in FIG. 11. FIG. 12b illustrates an out-of-phase situation where the electrical signal 306 does not cross both the first level 402 and the second level 400 in the same cycle. In FIG. 12a when the phase two signal goes high the first time 410 it clocks the D flip flop 360 causing the output 364 to go high. The output 370 of the D flip flop 354 does not go high until the first falling edge 412 of the phase one signal 310. As a result the flip flop 368 clocks a low output (false) 322 to the toggle flip flop 374 and the toggle flip flop 374 does not change the threshold level 326. The arming flip flop 376 has a high output 382, 386 when the D input 378 is high and the phase two signal 312 transitions high. The D input 378, 370 is high on the first falling edge 412 of the phase one signal 310. This arms the trigger flip flop 384, which has a high output 414 when the electrical signal 306 transitions low. This roughly corresponds to a subsequent falling edge of the phase one signal 310.

FIG. 12b shows the out-of-phase situation that results in the threshold control level 326 toggling. The first falling edge 412 of the phase one signal 310 occurs before the first rising edge 410 of the phase two signal 312. This causes the output 370 to be high when the clock input 366, 364 transitions high. As a result the phase signal 322 transitions high (true) and the toggle flip flop 374 causes the threshold control signal 326 to change. The arm signal 386, 382 again goes high (armed) when the output 370 is high and phase two signal has its next positive transition. Once the trigger flip flop 384 is armed it transitions high on a next falling edge of the electrical signal.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of detecting an ultrasonic signal in an ultrasonic flow meter, comprising the steps:

(a) selecting a threshold control level;
   (b) transmitting the ultrasonic signal;
   (c) receiving the ultrasonic signal;
   (d) determining if the ultrasonic signal exceeds a first level and a second level;
   (e) when the ultrasonic signal exceeds the first level and the second level, arming a trigger; and
   (f) triggering on an edge of the ultrasonic signal, to form a detected signal.

2. The method of claim 1, wherein step (d) further includes the steps of:

(d1) generating a phase one signal that is true when the ultrasonic signal exceeds the first level;

(d2) generating a phase two signal that is true when the ultrasonic signal exceed the second level;

(d3) determining if a first falling edge of the phase one signal occurs before a rising edge of the phase two signal.

3. The method of claim 1, further including the steps of:

(g) when the ultrasonic signal does exceed the first level but not the second level, selecting a second threshold level.

4. The method of claim 3, further including the steps of:

(h) arming a trigger when the ultrasonic signal exceeds the second threshold level;

(i) triggering on the edge of the ultrasonic signal, to form the detected signal.

5. An apparatus for detecting an ultrasonic signal, comprising:

a transducer producing an electrical signal in response to the ultrasonic signal;

a threshold comparator receiving the electrical signal and producing a phase one signal and a phase two signal;

an arming circuit receiving the phase one signal and the phase two signal and producing an arming signal; and a triggering circuit receiving the arming signal and the electrical signal and producing a signal detected signal.

6. The apparatus of claim 5, further including:

a phase comparator circuit receiving the phase one signal and the phase two signal and producing a phase signal;

a threshold level controller receiving the phase signal and producing a threshold level signal coupled to the threshold comparator.

7. The apparatus of claim 5, wherein the threshold comparator comprises, a pair of comparators coupled to the threshold level signal through a resistive circuit and having a second input coupled to the electrical signal.

8. The apparatus of claim 5, wherein the phase signal from the phase comparator circuit is true when the phase one signal and the phase two signal form an out-of-phase state.

9. The apparatus of claim 5, wherein the trigger circuit is a D-flip flop having a D input coupled to the arming signal and the clock input is coupled to the electrical signal.

10. The apparatus of claim 9, further including an inverter between the electrical signal and the clock input.

11. The apparatus of claim 6, wherein the phase comparator circuit comprises:

an inverter coupled to the phase one signal;

a first D flip flop having a clock input coupled to an output of the inverter;

a second D flip flop having a second clock input coupled to the phase two signal;

a third D flip flop having a D input coupled to an output of the first D flip flop and a third clock input coupled to an output of the second D flip flop.

12. The apparatus of claim 6, wherein the threshold level controller is a toggle flip flop.

13. A method of detecting an ultrasonic signal in an ultrasonic flow meter, comprising the steps:

(a) transmitting the ultrasonic signal;

(b) receiving the ultrasonic signal;

(c) converting the ultrasonic signal to an electrical signal;

(d) comparing the electrical signal to a first level to form a phase one signal;

(e) comparing the electrical signal to a second level to form a phase two signal;

(f) arming a trigger circuit on a next rising edge of the phase two signal after the first falling edge of the phase one signal; and (g) triggering a received signal when on an edge of the electrical signal after the trigger circuit is armed.

14. The method of claim 13, further including the step of:

(h) phase comparing the phase one signal and the phase two signal to form a phase signal;

(i) when the phase signal is true, switching from the first level to a third level.

15. The method of claim 14, further including the step of:

(j) when the phase signal is true, switching from the second level to a fourth level.

16. The method of claim 15, further including the steps of:

(k) when the phase signal is false, returning to step (a).

* * * * *